R. J. ELLSWORTH.
CASTER CONNECTING DEVICE.
APPLICATION FILED NOV. 8, 1919.
1,346,641.
Patented July 13, 1920.
2 SHEETS—SHEET 1.
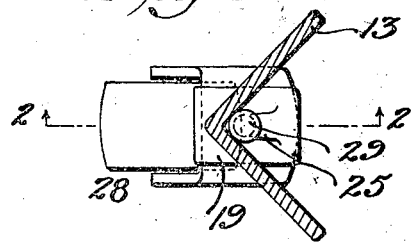
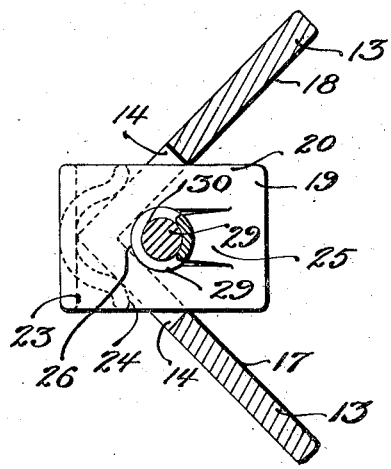
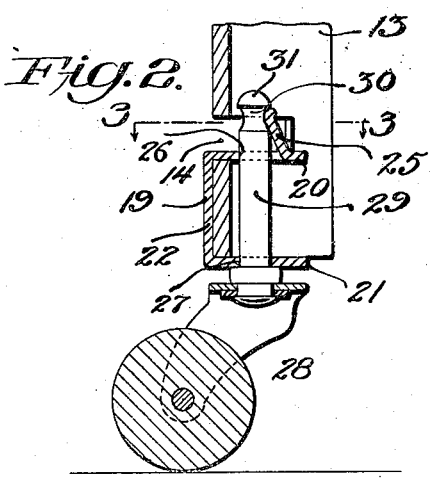
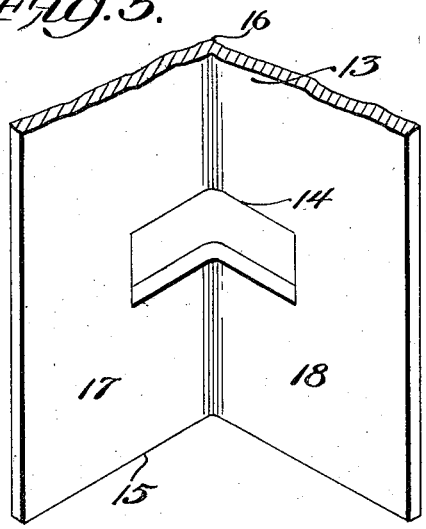
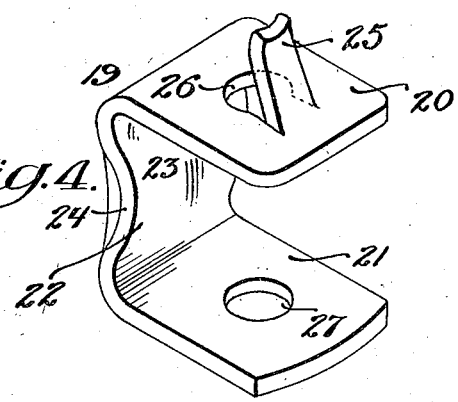
Witnesses:
R. H. Pamble
Augustus B. Copper
Inventor
Ross J. Ellsworth
By Joshua R. H. Potts
his Attorney R. J. ELLSWORTH.
CASTER CONNECTING DEVICE.
APPLICATION FILED NOV. 8, 1919.
1,346,641.
Patented July 13, 1920.
2 SHEETS—SHEET 2.
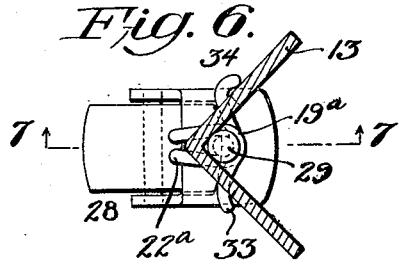
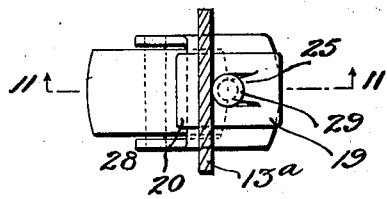
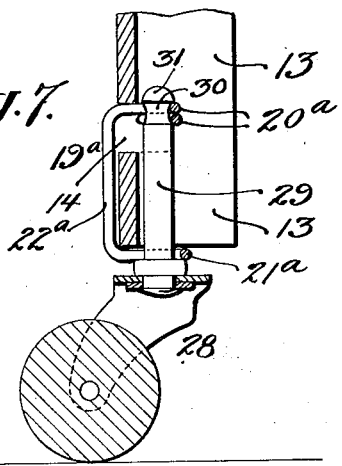
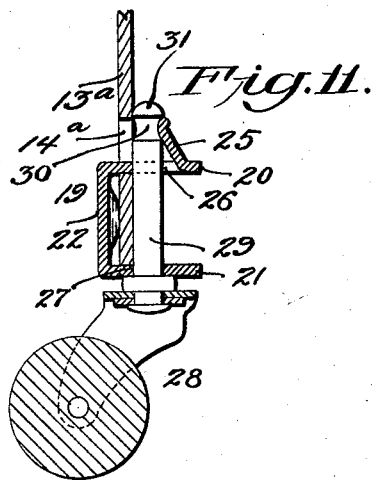
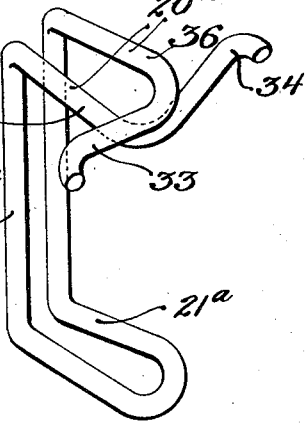
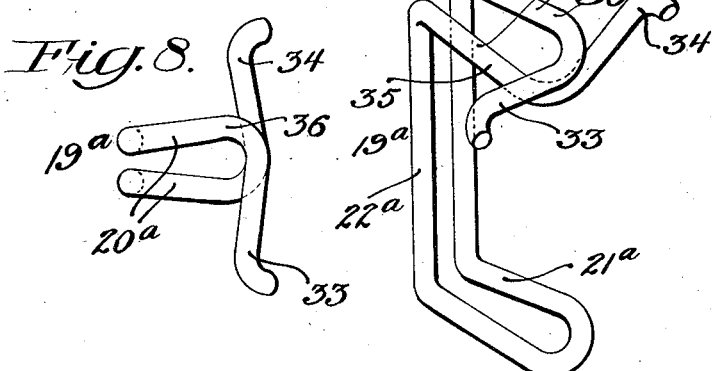
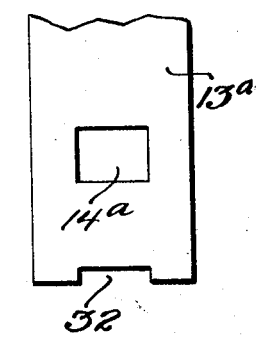
Witnesses:
R. H. Gamble.
Augustus B. Coppec
Inventor
Ross J. Ellsworth
By
Joshua R. H. Potts
His Attorney

UNITED STATES PATENT OFFICE.

ROSS J. ELLSWORTH, OF PHILADELPHIA, PENNSYLVANIA.

CASTER-CONNECTING DEVICE.

1,346,641.

Specification of Letters Patent. Patented July 13, 1920.

Application filed November 8, 1919. Serial No. 336,642.

*To all whom it may concern:*

Be it known that I, ROSS J. ELLSWORTH, a subject of the King of Great Britain, residing at Philadelphia, in the county of Philadelphia and State of Pennsylvania, have invented certain new and useful Improvements in Caster-Connecting Devices, of which the following is a specification.

It has always been a difficult problem to securely attach a caster to a thin metallic supporting structure, such for example as an angle-iron or other comparatively thin metallic leg of a bed or other piece of furniture. A number of devices have been invented for the above mentioned purpose but in most instances these devices are difficult to attach and often permit the casters to fall off when the article to which they are attached is lifted or turned over.

One object of my invention is to provide an improved caster-connecting device of simple construction which can be readily attached to metallic supporting legs for furniture or the like; the construction of my invention being such that it can be quickly and easily attached to an angle-iron supporting leg or to any structure which is too thin to permit the usual caster spindle to be projected into the thickness thereof.

Another object is to so construct my invention that it will serve to automatically lock the caster in position after the spindle of the caster has been inserted therein.

A still further object is to so construct my improved connecting device that it can be quickly and cheaply made and attached.

These objects, and other advantageous ends which will be described hereinafter, I attain in the following manner, reference being had to the accompanying drawings in which—

Figure 1 is a top plan view showing my invention attached to an angle-iron supporting leg, said leg being illustrated in section, Fig. 2 is a sectional elevation taken on the line 2—2 of Fig. 1, Fig. 3 is an enlarged sectional plan view taken on the line 3—3 of Fig. 2, Fig. 4 is a perspective view of the retaining clip illustrated in Figs. 1 to 3 and which forms a part of my invention, Fig. 5 is a fragmentary perspective view of the bottom portion of the angle-iron leg shown in Figs. 1 to 3 inclusive, and illustrating how the same is provided with an aperture to permit the attachment of the retaining clip and caster thereto, Fig. 6 is a view of similar nature to Fig. 1 illustrating a modified form of retaining clip, Fig. 7 is a sectional elevation taken on the line 7—7 of Fig. 6, Fig. 8 is a top plan view of the retaining clip shown in Figs. 6 and 7, Fig. 9 is a perspective view of said latter retaining clip, Fig. 10 is a top plan view showing my invention attached to a flat, metallic supporting leg; the retaining clip being the same as illustrated in Figs. 1 to 4 inclusive, Fig. 11 is a sectional elevation taken on the line 11—11 of Fig. 10, and Fig. 12 is a face view of the bottom portion of the supporting leg illustrated in Figs. 10 and 11.

Referring to Figs. 1 to 5 inclusive, 13 represents an angular supporting leg which may be made of angle-iron of the usual construction commonly employed in metallic furniture, such for example as hospital cots and beds or other articles. This leg 13 is provided with an aperture 14 positioned above the bottom edge 15 and the aperture 14 is cut out of the corner portion at the junction of the angularly disposed sides 17 and 18, as clearly shown in Fig. 5. A retaining clip 19 is preferably made of pressed sheet metal, such for example as sheet steel, and is substantially U-shape having arms 20 and 21 which extend substantially parallel to each other and bent from one intermediate portion 22. The arm 20 is adapted to be projected through the aperture 14 from the outside of the leg 13 so that the inner surface 23 of the intermediate portion 22 of the retaining clip 19 is located adjacent the outermost part of the corner 16, as clearly shown in Figs. 2 and 3. The arm 21 of the retaining clip will pass under the bottom edge 15 of the leg 13; the intermediate portion 22 having its side edges 24 bowed inwardly so as to embrace the outer faces of the respective sides 17 and 18 (see Figs. 3 and 4). This prevents lateral movement of the retaining clip relatively to the leg 13. The arm 20 of the retaining clip is provided with a finger 25 which is cut or pressed upwardly from the arm 20, as shown in Figs. 2 and 4. This provides a hole 26 in the arm 20 and the arm 21 is also provided with a hole 27 which is directly below the hole 26. The caster 28 has its spindle 29 notched or grooved as shown at 30 adjacent its top and said spindle 29 is adapted to be projected upwardly through the holes 27 and 26 in the arms 21 and 20 respectively. The finger 25 is preferably made resilient and is normally in such position that the head 31 of the spindle 29, during its insertion, will engage the finger 25 and push the latter out of its normal position until the head 31 passes the top end of the finger 25 after which the top end of the finger 25 will spring into the notch 30 and thereby prevent the spindle 29 from accidentally falling out of the retaining clip. It will also be noted that the insertion of the spindle as above described will lock the retaining clip to the leg 13.

The attachment of the caster as above described can be quickly effected. It is merely necessary to slip the arm 20 through the aperture 14 and then push the spindle 29 upwardly through the holes 27 and 29 and the finger 25 will snap within the notch 30.

In the form of my invention shown in Figs. 10 to 12 inclusive, the structure is similar to that just described with exception that the flat supporting leg 13$^a$ is preferably provided with a recess 32 in its bottom edge to receive the arm 21 of the retaining clip 19; the arm 20 of said retaining clip being projected through the aperture 14$^a$. The remaining parts are similar to that described in connection with Figs. 1 to 4 inclusive and I have therefore given corresponding parts similar reference numerals.

In the form of my invention shown in Figs. 6 to 9 inclusive, instead of the sheet metal retaining clip, I have illustrated a retaining clip 19$^a$ which can be made of a single length of spring steel or other resilient wire. This latter form of retaining clip has a looped arm portion 21$^a$, an upper arm portion 20$^a$; said arm portion 20$^a$ including the overlapped ends 33 and 34 of the wire. The arm portion 20$^a$ of the clip 19$^a$ is adapted to be inserted through the aperture 14 and the intermediate portion 22$^a$ will extend downwardly adjacent the outer faces of the sides 17 and 18 of the leg 13. The spindle 29 can be projected upwardly through the looped arms 21$^a$ and 20$^a$ and the head 31 of the spindle will initially spread the parts 35 and 36 of the arm 20$^a$ after which said parts 35 and 36 will spring back to their normal position and engage within the notch 30.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination of a supporting member having an aperture; a retaining clip having a portion projecting into said aperture and another part embracing a portion of said supporting member, said portion of the clip having a hole therein and a resilient part adjacent said hole; and a caster having a spindle projecting upwardly through said hole, said spindle having a part of reduced diameter providing a notch, said spindle having a portion adjacent said notch adapted to move said resilient part of the clip out of its normal position during the insertion of the spindle through said hole, said resilient part being operative to spring into said notch after said portion of the spindle has passed by it during said inserting movement thereof; substantially as described.

2. The combination of a supporting member; a caster; and a resilient clip supported by said supporting structure and having a portion for clamping engagement with a part of said caster for securing the latter to the supporting structure; substantially as described.

In testimony whereof I have signed my name to this specification in the presence of two subscribing witnesses.

ROSS J. ELLSWORTH.

Witnesses:
ANNA RENTON,
CHAS. E. POTTS.